US009133926B2

(12) United States Patent
Hayes et al.

(10) Patent No.: US 9,133,926 B2
(45) Date of Patent: Sep. 15, 2015

(54) PINION GEAR ASSEMBLY

(71) Applicant: ArvinMeritor Technology, LLC, Troy, MI (US)

(72) Inventors: Brian D. Hayes, Newark, OH (US); Robert J. Martin, Newark, OH (US); Srinivasa P. Rengasamy, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 269 days.

(21) Appl. No.: 13/683,021

(22) Filed: Nov. 21, 2012

(65) Prior Publication Data
US 2014/0137683 A1    May 22, 2014

(51) Int. Cl.
*F16H 1/14* (2006.01)
*F16H 55/17* (2006.01)
*F16C 35/02* (2006.01)
*F16C 17/02* (2006.01)
*F16H 48/42* (2012.01)

(52) U.S. Cl.
CPC ............... *F16H 55/17* (2013.01); *F16C 17/02* (2013.01); *F16C 35/02* (2013.01); *F16H 1/14* (2013.01); *F16H 2048/426* (2013.01); *Y10T 74/1987* (2015.01)

(58) Field of Classification Search
CPC .......................... F16H 57/021; F16C 35/073
USPC ............ 74/423, 424; 384/537, 538, 539, 541, 384/559, 584, 585, 561, 903, 906
See application file for complete search history.

(56) References Cited

U.S. PATENT DOCUMENTS

| 1,002,858 | A | * | 9/1911 | McCue ............................ 74/424 |
| 1,812,784 | A | * | 6/1931 | Hawley, Jr. ................... 384/585 |
| 2,126,691 | A | * | 8/1938 | Schmitter ....................... 74/410 |
| 3,807,820 | A | | 4/1974 | Schuhmann |
| 4,984,345 | A | | 1/1991 | Sawada et al. |
| 5,443,316 | A | * | 8/1995 | Deane et al. ................... 384/485 |
| 5,489,156 | A | | 2/1996 | Martinie |
| 6,544,140 | B2 | | 4/2003 | Gradu et al. |
| 6,719,110 | B2 | * | 4/2004 | Ishikawa et al. ................ 192/35 |
| 8,398,310 | B2 | * | 3/2013 | Ehlert et al. ................... 384/495 |
| 2003/0091251 | A1 | * | 5/2003 | Ni et al. ........................ 384/295 |
| 2007/0217727 | A1 | * | 9/2007 | Axelsson et al. ............. 384/544 |
| 2010/0080498 | A1 | | 4/2010 | Tamura et al. |
| 2012/0186390 | A1 | * | 7/2012 | Cook et al. ...................... 74/640 |

FOREIGN PATENT DOCUMENTS

| EP | 2023009 A1 | 2/2009 |
| FR | 2150142 A5 | 3/1973 |
| JP | 5187821 B2 | 7/1976 |
| JP | 54158947 U | 11/1979 |
| JP | 2010286011 A | 12/2010 |
| SU | 979736 A1 | 12/1982 |
| WO | 2011037640 A1 | 3/2011 |

OTHER PUBLICATIONS

European Patent Office, Extended Search Report for the corresponding European Patent Application No. EP13184928.3 mailed Nov. 21, 2013.

* cited by examiner

*Primary Examiner* — William C Joyce
(74) *Attorney, Agent, or Firm* — Brooks Kushman P.C.

(57) ABSTRACT

A pinion gear assembly having a pinion, a collar, and a bearing. The pinion may have a gear portion and a hub portion disposed proximate the gear portion. The collar may be fixedly disposed on the hub portion and the bearing may be fixedly disposed on the collar.

19 Claims, 10 Drawing Sheets

US 9,133,926 B2

PINION GEAR ASSEMBLY

TECHNICAL FIELD

The present application relates to a pinion gear assembly.

BACKGROUND

A pinion mounting with a direct tapered roller bearing arrangement is disclosed in U.S. Pat. No. 6,544,140.

SUMMARY

In at least one embodiment, a pinion gear assembly is provided. The pinion gear assembly may include a pinion, a collar, and a bearing. The pinion may extend along an axis and may have a gear portion and a hub portion. The collar may have a collar hole that may receive the hub portion. The bearing may have a bearing hole that may receive the collar. The collar may be fixedly disposed on the hub portion and the bearing may be fixedly disposed on the collar.

In at least one embodiment, a pinion gear assembly is provided. The pinion gear assembly may include a pinion, a collar, a bearing, and a collar snap ring. The pinion may extend along an axis. The pinion may have a gear portion and a hub portion disposed proximate the gear portion. The collar may have a collar hole and a collar snap ring groove. The collar hole may receive the hub portion. The bearing may define a bearing hole that may receive the collar. The collar snap ring may be disposed in the collar snap ring groove and may inhibit movement of the bearing with respect to the collar.

In at least one embodiment, a pinion gear assembly is provided. The pinion gear assembly may include a pinion, a collar, a hub snap ring, and a bearing. The pinion may have a gear portion and a hub portion disposed proximate the gear portion. The hub portion may extend from a pinion end surface and may have a hub snap ring groove. The collar may define a collar hole that may receive the hub portion. The hub snap ring may be received in the hub snap ring groove and may engage the collar to inhibit movement of the collar with respect to the pinion. The bearing may define a bearing hole that may receive the collar. The bearing may be fixedly disposed on collar.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
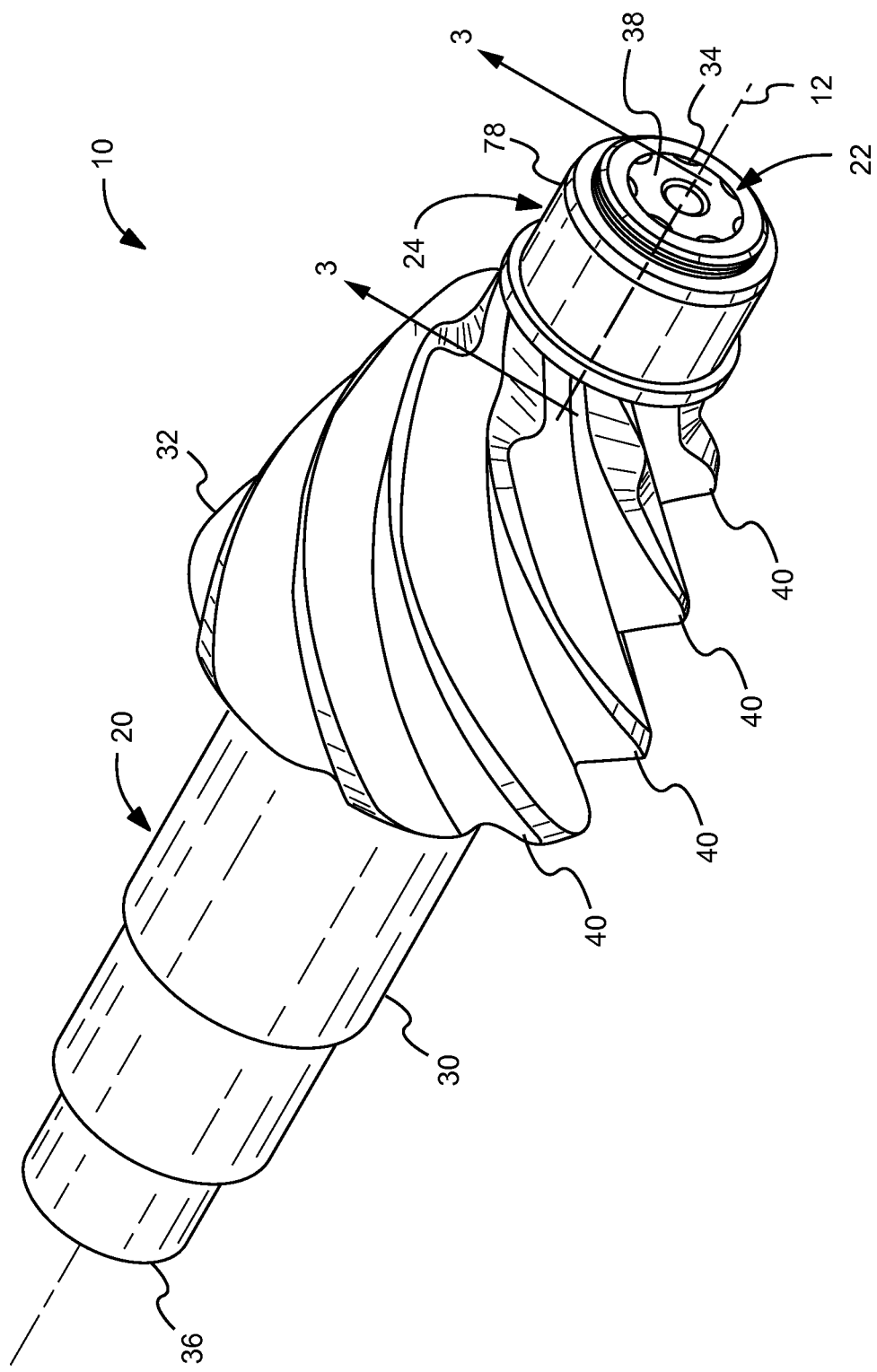
FIG. 1 is a perspective view of an exemplary pinion gear assembly.
Figure 2:
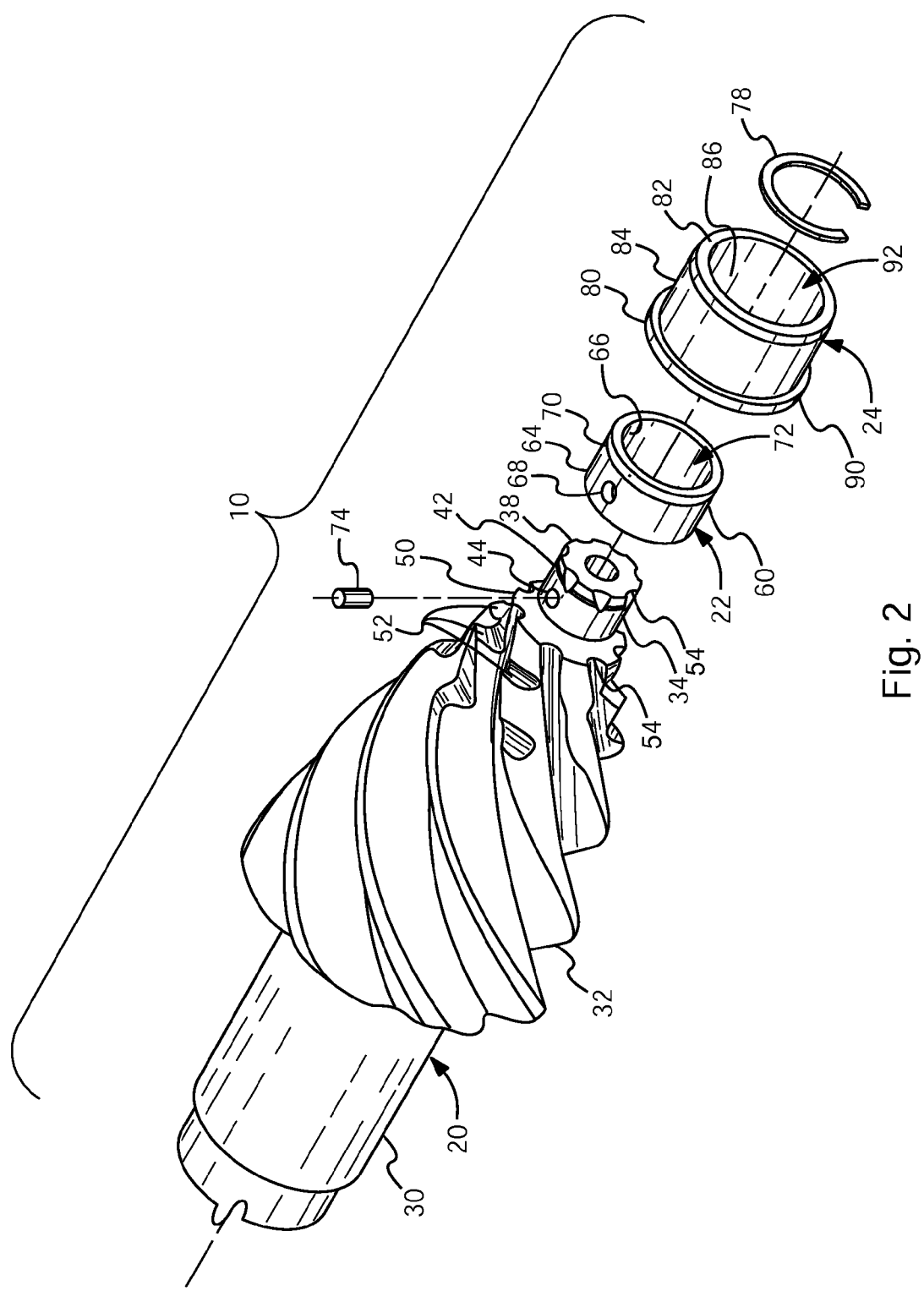
FIG. 2 is an exploded view of the pinion gear assembly of FIG. 1.
Figure 3:
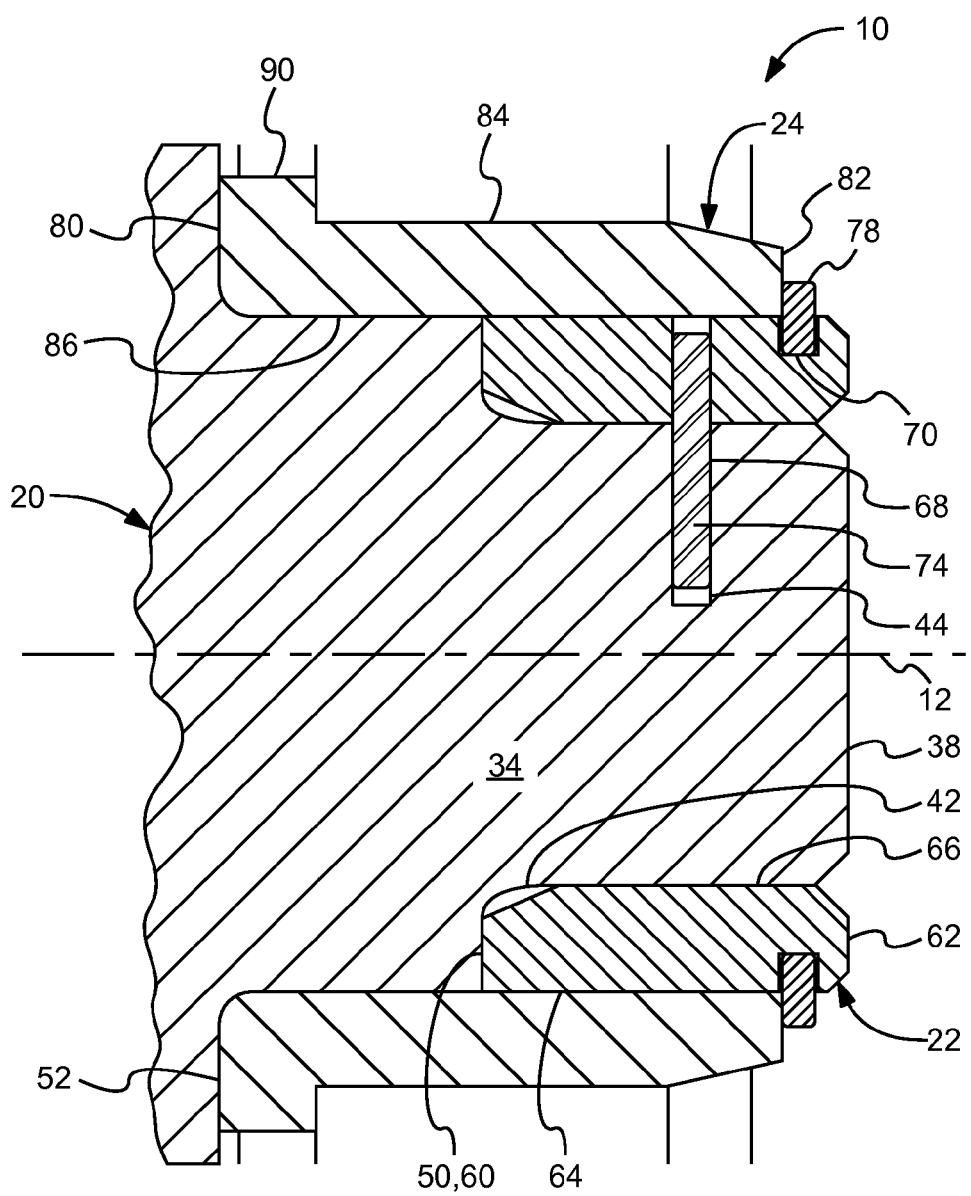
FIG. 3 is a section of the pinion gear assembly along section line 3-3 in FIG. 1.

Referring to FIGS. 1 and 2, an exemplary pinion gear assembly 10 is shown. The pinion gear assembly 10 may be configured for use in a vehicle, such as a motor vehicle like a truck, bus, farm equipment, or cargo loading equipment for land, air, or marine vessels. For example, the pinion gear assembly 10 may be part of an axle assembly or differential that may be configured to transmit torque to vehicle traction wheel assemblies and permit the traction wheel assemblies to rotate at different velocities. In a differential, the pinion gear assembly 10 may be rotatably supported by one or more bearings and may rotate about an axis 12. The pinion gear assembly 10 may be coupled to a torque source, such as a vehicle drivetrain component like a motor. Torque that is provided to the pinion gear assembly 10 may be transmitted to another component, such as a ring gear. Torque may be transmitted from the ring gear to at least one axle and from an axle to at least one corresponding wheel hub and/or traction wheel assembly.

The pinion gear assembly 10 may include a pinion 20, a collar 22, and a bearing 24.

The pinion 20 may extend along the axis 12. The pinion 20 may be made of any suitable material, such as a metal alloy. The pinion 20 may have a shaft portion 30, a gear portion 32, and a hub portion 34. The pinion 20 may have a unitary or one piece construction in which the shaft portion 30, gear portion 32, and hub portion 34 are integrally formed.

The shaft portion 30 may extend from a first pinion end surface 36 of the pinion 20 toward a second pinion end surface 38 of the pinion 20. For example, the shaft portion 30 may extend from the first pinion end surface 36 to the gear portion 32. In at least one embodiment, the shaft portion 30 may be generally cylindrical or may have one or more substantially cylindrical exterior surfaces. The shaft portion 30 may be coupled to a torque source and may be rotatably supported by one or more bearing assemblies.

The gear portion 32 may be disposed adjacent to and may extend outwardly from the shaft portion 30. The gear portion 32 may include a set of teeth 40. The teeth 40 may be arranged about the axis 12 and provided in a repeating pattern. In at least one embodiment, the gear portion 32 may be configured as a hypoid gear or a bevel gear, such as a plain bevel gear or a spiral bevel gear. As such, the gear portion 32 may have a generally tapered or truncated conical shape that may become narrower (e.g., disposed closer to the axis 12) in a direction that extends from the first pinion end surface 36 toward the second pinion end surface 38. The teeth 40 may be provided in the pinion 20 by cutting or removing material from the gear portion 32.

The hub portion 34 may be disposed proximate the gear portion 32. For example, the hub portion 34 may extend from the gear portion 32 to the second pinion end surface 38 of the pinion 20. As such, the hub portion 34 may be disposed at an end of the pinion 20. The hub portion 34 may be generally cylindrical in shape and may be centered about the axis 12. As such, the hub portion 34 may have an outer hub surface 42 that may extend from the second pinion end surface 38 toward the gear portion 32 and may at least partially define a circumference of the hub portion 34. In addition, the hub portion 34 or outer hub surface 42 may have a smaller diameter than the shaft portion 30 and the gear portion 32 to provide additional clearance for a gear tooth cutting tool as will be discussed in more detail below.

In at least one embodiment, the hub portion 34 may also include a hub keyhole 44. The hub keyhole 44 may be disposed between the second pinion end surface 38 and the gear portion 32 and may extend from the outer hub surface 42 toward the axis 12. The hub keyhole 44 may be configured as a blind hole in one or more embodiments.

The gear portion 32 and/or hub portion 34 may include one or more shoulders. In FIG. 2, a first shoulder 50 and a second shoulder 52 are provided. The first and second shoulders 50, 52 may help position and inhibit axial movement of the collar 22 and bearing 24 as will be discussed in more detail below. The first shoulder 50 may be provided with or may be disposed adjacent to the hub portion 34. For instance, the first shoulder 50 may extend radially outward with respect to the axis 12 from the outer hub surface 42. The second shoulder 52 may be spaced apart from the first shoulder 50 and may be disposed closer to the first pinion end surface 36 of the pinion 20. The second shoulder 52 may also extend radially outward with respect to the axis 12. The second shoulder 52 may be positioned further from the axis 12 than the first shoulder 50. In addition, the first shoulder 50 and/or second shoulder 52 or portions thereof may be discontinuous or interrupted by grooves 54 disposed between adjacent gear teeth 40 in one or more embodiments.

The collar 22 may be fixedly disposed on the pinion 20. In at least one embodiment, the collar 22 may be configured as a ring or a hollow cylinder that may extend around the axis 12. The collar 22 may include a first end surface 60, a second end surface 62, an outer surface 64, an inner surface 66, a collar keyhole 68, and a collar snap ring groove 70. In at least one embodiment, the collar 22 may be made of a metal or metal alloy and may be hardened to withstand load forces.

The first end surface 60 may face toward and may engage the first shoulder 50. In at least one embodiment, the first end surface 60 may be disposed substantially perpendicular with respect to the axis 12.

The second end surface 62 may be spaced apart from and disposed opposite the first end surface 60. The second end surface 62 may also extend substantially perpendicular with respect to the axis 12 and may be disposed proximate the second pinion end surface 38. In various embodiments, the second end surface 62 may be aligned with or offset from the second pinion end surface 38.

The outer surface 64 may extend from the first end surface 60 to or toward the second end surface 62. The outer surface 64 may be an outer circumferential surface of the collar 22.

The inner surface 66 may be disposed opposite the outer surface 64. The inner surface 66 may be an inner circumferential surface of the collar 22 and may at least partially define a collar hole 72. The collar hole 72 may extend from the first end surface 60 to the second end surface 62 and may receive the hub portion 34. The inner surface 66 may engage the outer hub surface 42.

The collar keyhole 68 may extend from the outer surface 64 to the inner surface 66. The collar keyhole 68 may be aligned with the hub keyhole 44 and may be configured to receive a key 74. The key 74 may be press fit into the hub keyhole 44 and/or the collar keyhole 68 to inhibit movement of the collar 22 with respect to the pinion 20. In addition, the key 74 may be installed before the bearing 24 is positioned on the collar 22. The key 74 may have any suitable configuration. For example, the key 74 may have a solid or hollow configuration and may be configured as a pin in one or more embodiments.

The collar snap ring groove 70 may be provided on the collar 22. The collar snap ring groove 70 may be disposed between the collar keyhole 68 and the second end surface 62. In addition, the collar snap ring groove 70 may extend continuously around the axis 12 and may extend from the outer surface 64 toward the inner surface 66 and may be spaced apart from the collar hole 72.

The collar snap ring groove 70 may be configured to receive a collar snap ring 78. The collar snap ring 78 may be disposed in the collar snap ring groove 70 to inhibit axial movement of the bearing 24 with respect to the collar 22. For example, the collar snap ring 78 may engage the bearing 24 to inhibit removal of the bearing 24 from the collar 22.

The bearing 24 may be fixedly disposed on the collar 22. In at least one embodiment, the bearing 24 may be an inner race of a bearing assembly that rotatably supports the pinion 20. The bearing 24 may include a first bearing end surface 80, a second bearing end surface 82, an outer bearing surface 84, and an inner bearing surface 86.

The first bearing end surface 80 may face toward and may engage a part of the pinion 20, such as the second shoulder 52. In at least one embodiment, the first bearing end surface 80 may be disposed substantially perpendicular with respect to the axis 12. The first bearing end surface 80 may at least partially define a flange 90 that extends outwardly from the outer bearing surface 84. The flange 90 may engage and help position a set of rollers or roller bearings that may be provided with a bearing assembly in one or more embodiments.

The second bearing end surface 82 may be spaced apart from and disposed opposite the first bearing end surface 80. The second bearing end surface 82 may extend substantially perpendicular with respect to the axis 12 and may be disposed proximate the second pinion end surface 38. In various embodiments, the second bearing end surface 82 may be aligned with or offset from the second pinion end surface 38. The collar snap ring 78 may engage the second bearing end surface 82 to inhibit axial movement of the bearing 24.

The outer bearing surface 84 may extend from the flange 90 to the second bearing end surface 82. The outer bearing surface 84 may be an outer circumferential surface of the bearing 24 and may engage and support a set of rollers or roller bearings in one or more embodiments. The outer bearing surface 84 may have a smaller diameter than the flange 90.

The inner bearing surface 86 may be disposed opposite the outer bearing surface 84. The inner bearing surface 86 may be an inner circumferential surface of the bearing 24 and may at least partially define a bearing hole 92. The bearing hole 92 may extend from the first bearing end surface 80 to the second bearing end surface 82 and may receive the collar 22 and/or the hub portion 34. The inner bearing surface 86 may engage the outer surface 64 of the collar 22 and/or the pinion 20.

Referring to FIGS. 4-10, additional pinion gear assembly configurations are shown. The pinion gear assemblies in each of these figures may share components or characteristics of the pinion gear assembly 10 described above. For example, each pinion gear assembly described below may include a pinion, a collar, and a bearing.

Figure 4:
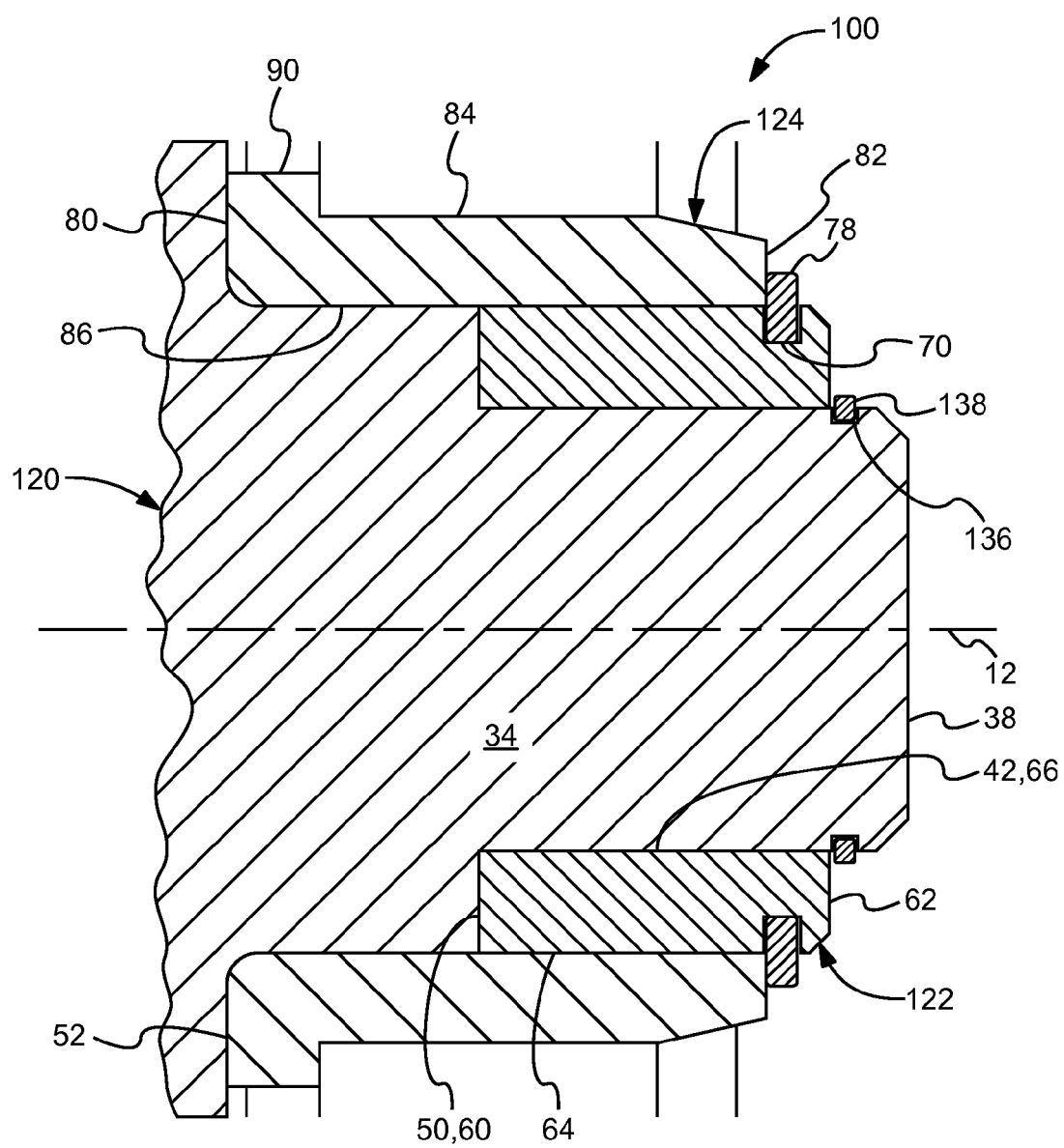
FIGS. 4-10 are section views of various pinion gear assembly configurations.

Referring to FIG. 4, the pinion gear assembly 100 includes a pinion 120, a collar 122, and a bearing 124. The pinion 120 may include a shaft portion 30, a gear portion 32, and a hub portion 34 that may be similar or analogous to those previously described. The hub portion 34 may include a hub snap ring groove 136 that may extend continuously around the axis 12. The hub snap ring groove 136 may be disposed between the second pinion end surface 38 and the first shoulder 50 and/or the first end surface 60 of the collar 122. The hub snap ring groove 136 may also extend from the outer hub surface 42 toward the axis 12. The hub snap ring groove 136 may receive a hub snap ring 138. The hub snap ring 138 may engage the second end surface 62 of the collar 122 to inhibit movement of the collar 122 with respect to the pinion 120. The collar 122 may include a collar snap ring groove 70 that receives a collar snap ring 78 that inhibits axial movement of the bearing 124 as previously described. The collar 122 may be press fit onto the hub portion 34 to inhibit rotation of the collar 122 with respect to the axis 12.

Figure 5:
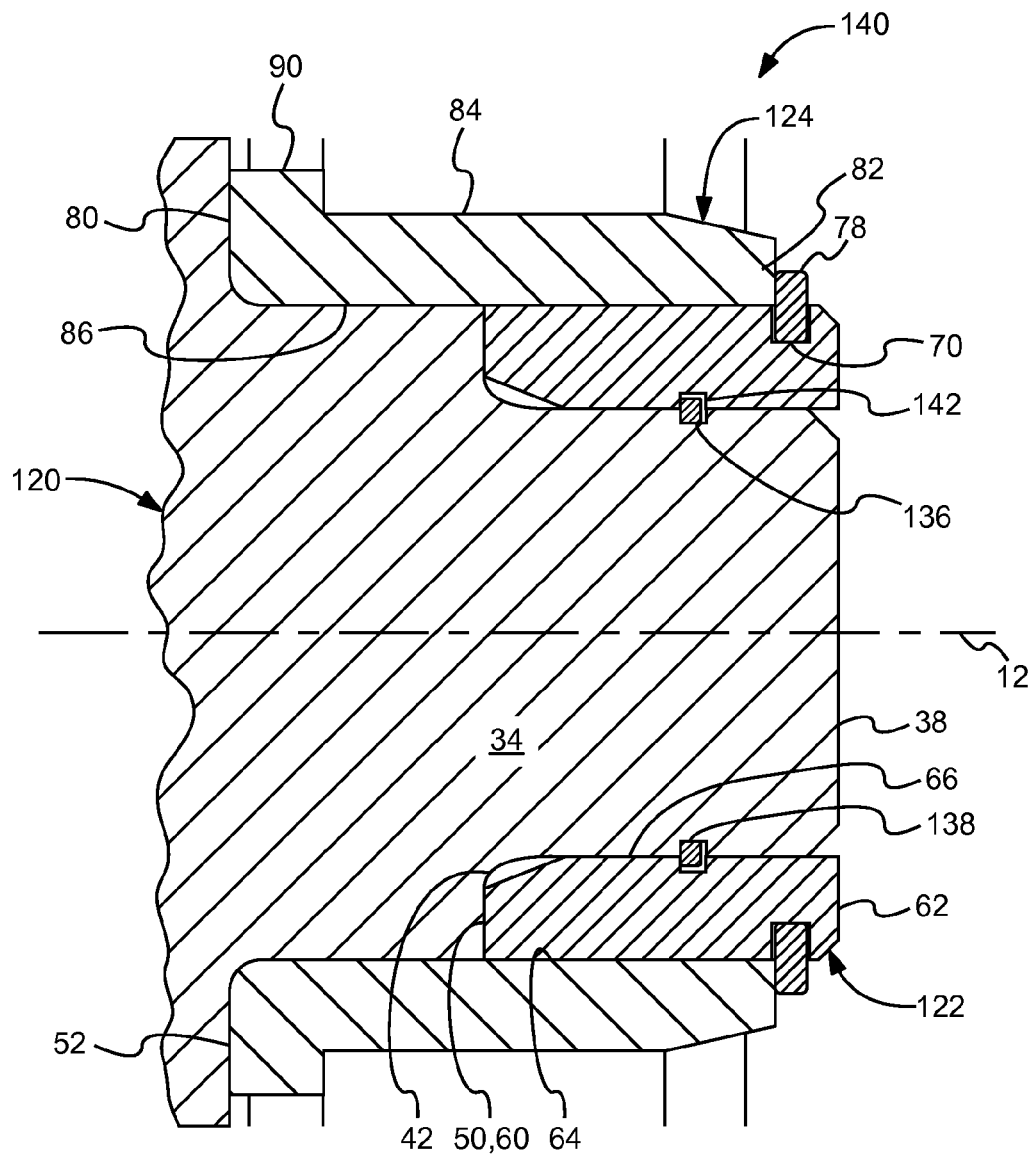

Referring to FIG. 5, the pinion gear assembly 140 has a configuration similar to that shown in FIG. 4. In this embodiment, the hub snap ring groove 136 is positioned inside the collar 122. The collar 122 may have an inner snap ring groove 142 that may extend from the inner surface 66 toward the outer surface 64. The hub snap ring 138 may be received in the hub snap ring groove 136 and the inner snap ring groove 142 to inhibit axial movement of the collar 122. The collar 122 may be press fit onto the hub portion 34 to inhibit rotation of the collar 122 with respect to the axis 12.

Figure 6:
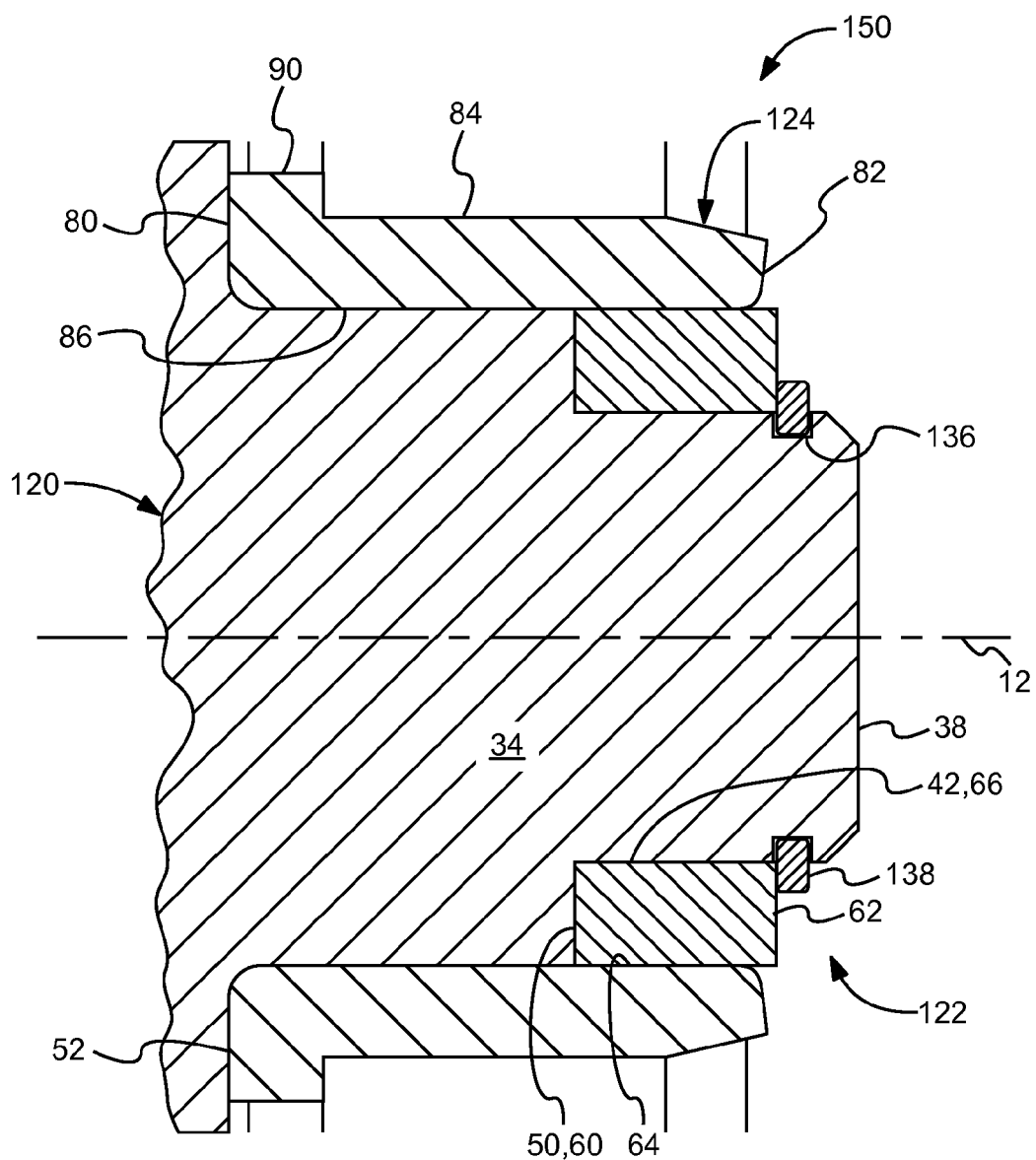

Referring to FIG. 6, the pinion gear assembly 150 has a configuration similar to that shown in FIG. 4. In this embodiment, the bearing 124 may be press fit onto the collar 122 and hub portion 34 to inhibit rotational and axial movement of the bearing 124. The collar 122 may be provided without a collar snap ring groove 70 and the collar snap ring 78 may be omitted. This configuration may be suitable for applications in which the frictional forces exerted on the inner bearing surface 86 are sufficient to inhibit axial movement of the bearing 124 without the use of a collar snap ring 78.

Figure 7:
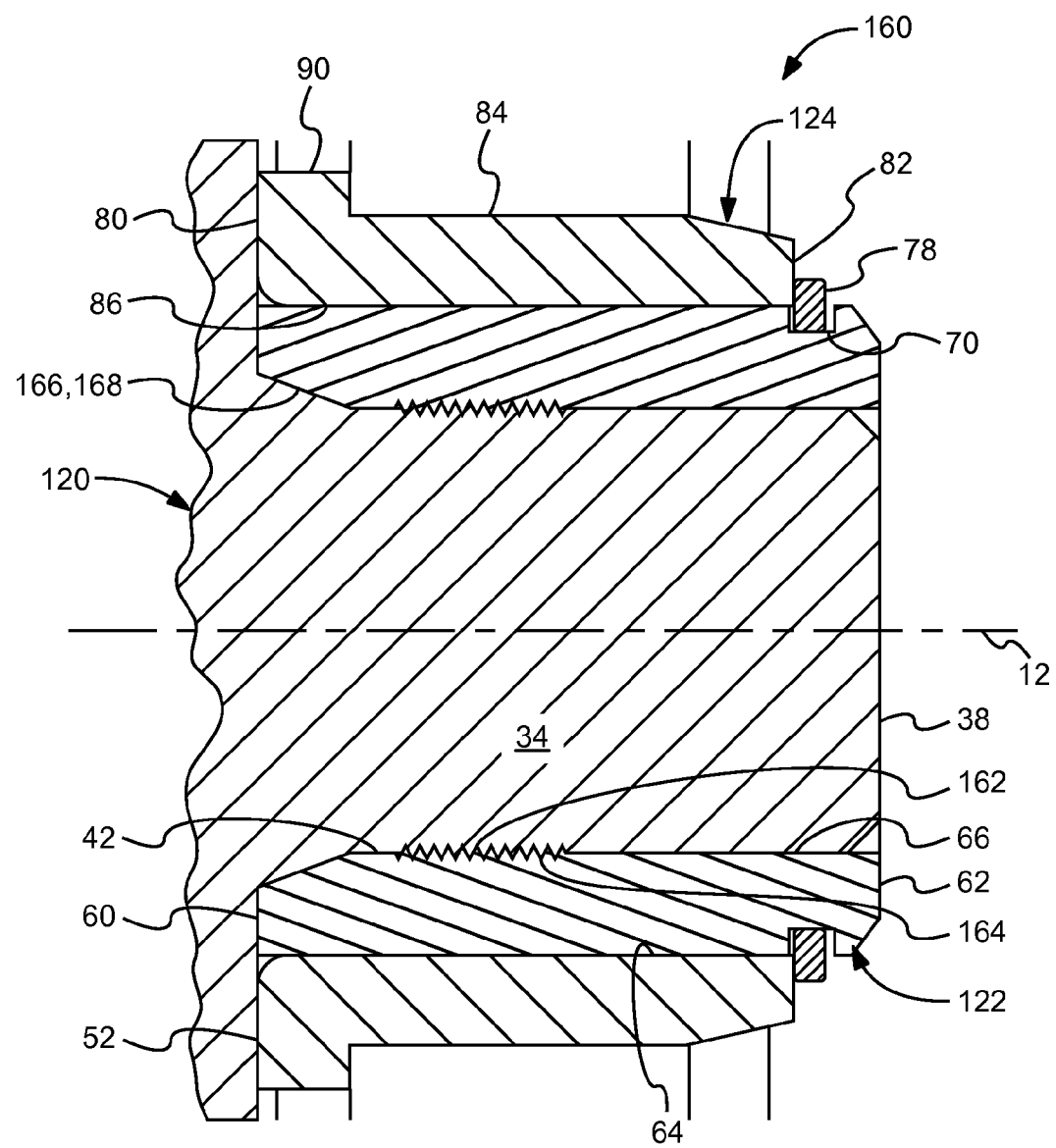

Referring to FIG. 7, the pinion gear assembly 160 has a pinion 120 and a collar 122 that include mating threaded portions. More specifically, the hub portion 34 of the pinion 120 may include a hub threaded portion 162 and the collar 122 may have a collar threaded portion 164 that may be provided on the inner surface 66. The hub threaded portion 162 may mate with the collar threaded portion 164 to fixedly couple the collar 122 to the pinion 120. The threads on the hub threaded portion 162 and collar threaded portion 164 may be configured to oppose rotational forces exerted on the collar 122 and/or bearing 124. For instance, left hand threads or right hand threads may be used that counteract rotational forces to help inhibit the collar 122 from unscrewing from about the pinion 120. The collar 122 and bearing 124 may engage different shoulders 50, 52 as previously discussed or may engage a common shoulder 50 as shown in FIG. 7. The bearing 124 may be press fit onto the collar 122 to inhibit movement of the bearing 124 and a collar snap ring 78 may or may not be provided to inhibit axial movement of the bearing 124. Optionally, the pinion 120 and collar 122 may include mating features and/or surfaces that facilitate fitting and alignment. For instance, the pinion 120 may include a first alignment feature 166 that may engage a second alignment feature 168 on the collar 122. The first and second alignment features 166, 168 may have any suitable configuration. In FIG. 7, the second alignment feature 168 may extend from the first end surface 60 to the inner surface 66 of the collar 122 and may be disposed at an angle with respect to the inner surface 66, while the first alignment feature 166 may extend from the outer hub surface 42 to the first shoulder 50. As such, the first and second alignment features 166, 168 may help center or position and align the collar 122, and in turn the bearing 124, with respect to the axis 12. Moreover, first and second alignment features 166, 168 may be provided with any of the other pinion gear assemblies described in this application.

Figure 8:
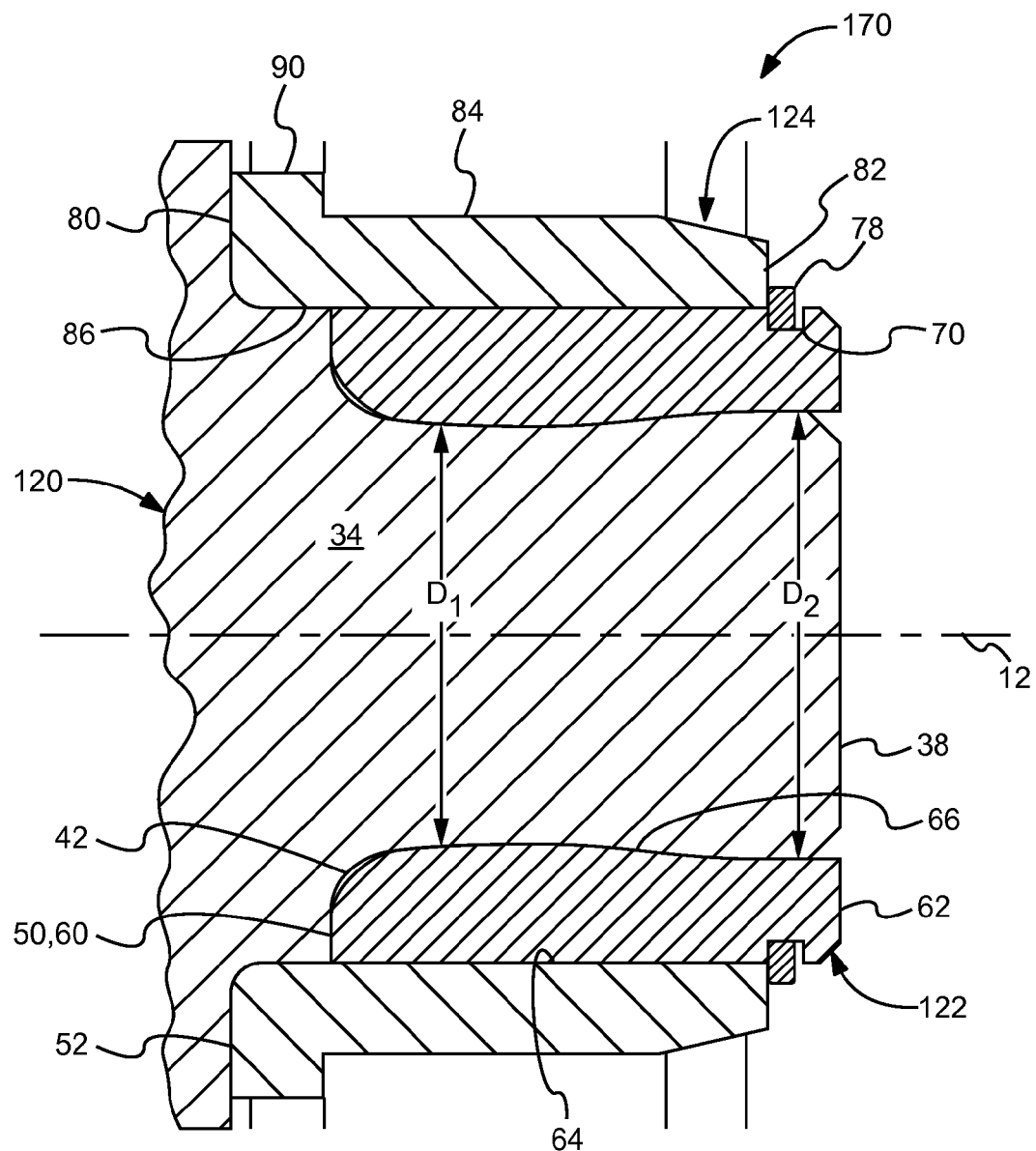

Referring to FIG. 8, the pinion gear assembly 170 may have a collar 122 and hub portion 34 that may be tapered to inhibit movement of the collar 122. For example, the outer hub surface 42 of the hub portion 34 may be tapered or enlarged near the second pinion end surface 38. As such, the diameter of the hub portion 34 may increase in a direction that extends from the gear portion 32 toward the second pinion end surface 38. For example, diameter $D_1$ may be less than diameter $D_2$. The collar 122 may be tapered in a similar manner such the inner surface 66 has a smaller diameter at or near the first end surface 60 than at or near the second end surface 62. The collar 122 may be press fit onto the hub portion 34 and the tapered configurations of the outer hub surface 42 and inner surface 66 may cooperate to inhibit axial movement of the collar 122. The collar 122 may be provided with a collar snap ring groove 70 that receives a collar snap ring 78 to inhibit axial movement of the bearing 124 as previously described. The bearing 124 may be press fit onto the collar 122 to inhibit movement of the bearing 124 and a collar snap ring 78 may or may not be provided to inhibit axial movement of the bearing 124. Moreover, the tapered configurations of the collar 122 and hub portion 34 may be provided with any of the other pinion gear assemblies described in this application.

Figure 9:
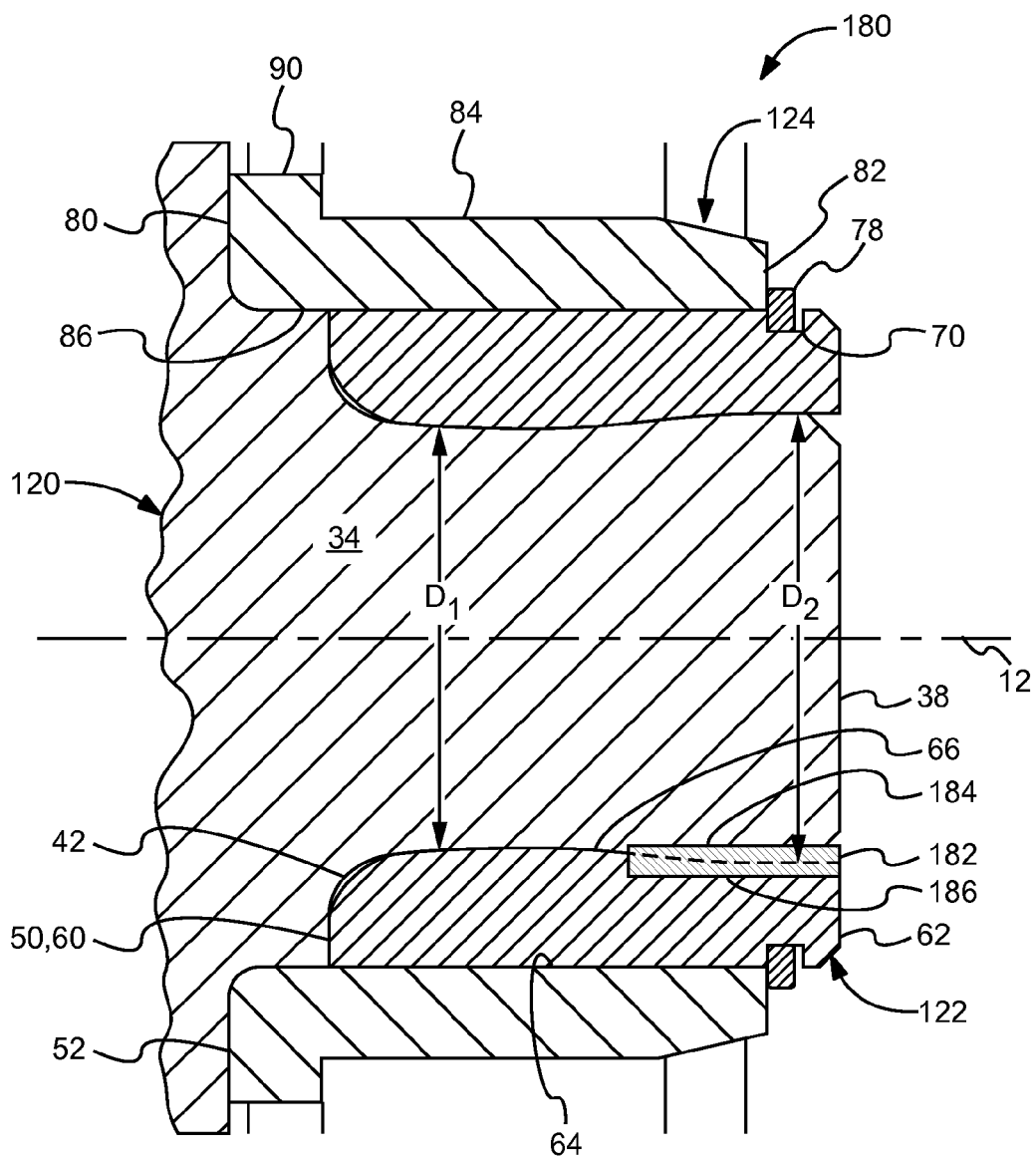

Referring to FIG. 9, the pinion gear assembly 180 has a tapered configuration similar to that shown in FIG. 8. In addition, an axial key 182 is provided to inhibit rotation of the collar 122 about the axis 12. The axial key 182 may be integrally formed with the collar 122 or the hub portion 34 or may be a separate component. The axial key 182 may be offset from the axis 12 and extend generally parallel to the axis 12 in one or more embodiments. For instance, an axial key 182 that is provided as a separate component may be received in a first axial opening or first axial groove 184 in the hub portion 34 and a second axial opening or second axial groove 186 in the collar 122. An axial key 182 that is integrally formed with the collar 122 may be received in the first axial groove 184. Similarly, an axial key 182 that is integrally formed on the hub portion 34 may be received in the second axial groove 186. Alternatively, the hub portion 34 may have a flat that may interrupt the generally cylindrical configuration of the hub portion 34. As such, the hub portion 34 may have a generally D-shaped configuration when viewed along the axis 12 that may engage an axial key 182 to inhibit rotation of the collar 122.

Figure 10:
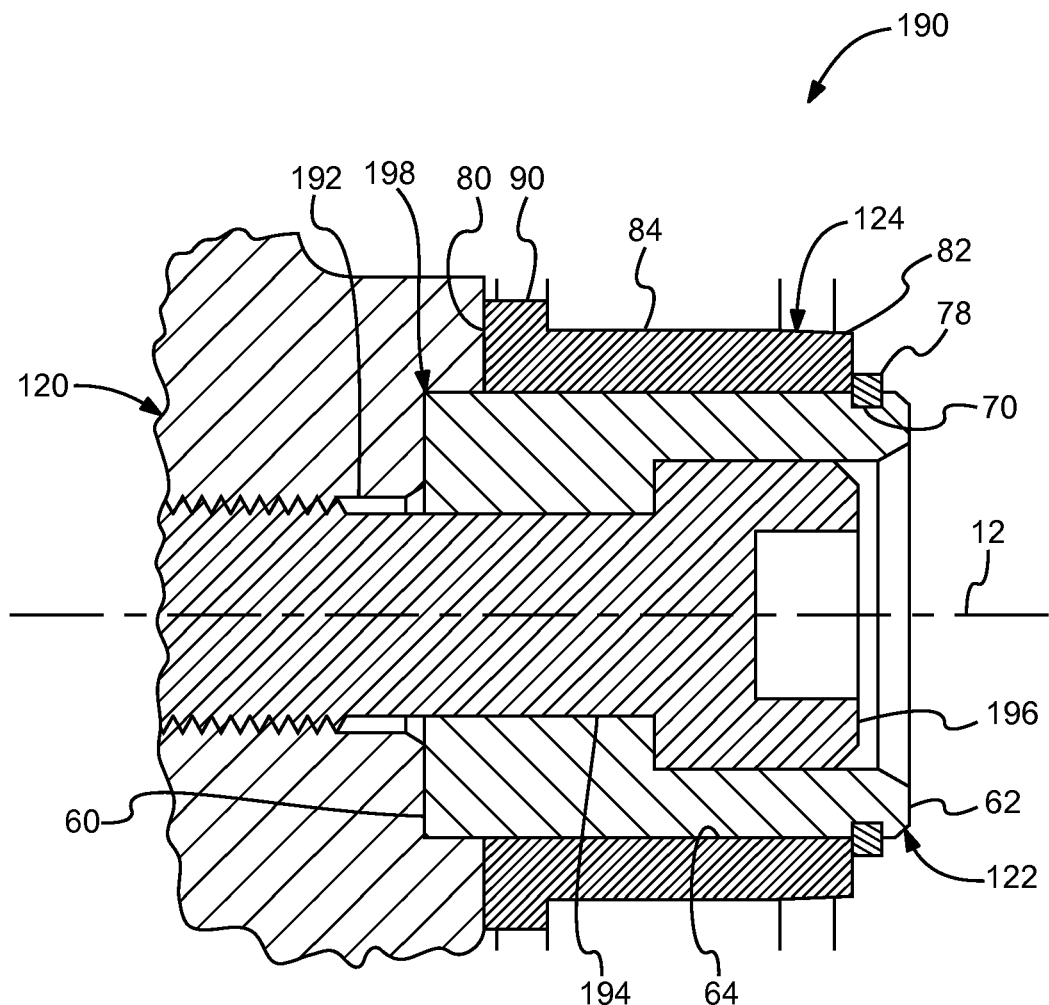

Referring to FIG. 10, the pinion gear assembly 190 may use a fastener to assembly the pinion 120 and the collar 122. For example, the pinion 120 may have a pinion fastener hole 192 that may extend along the axis 12. The collar 122 may have a collar fastener hole 194 that may extend along the axis 12 and through the collar 122. The pinion fastener hole 192 and/or collar fastener hole 194 may be threaded. A fastener 196 may be received in the pinion fastener hole 192 and the collar fastener hole 194 to secure the collar 122 to the pinion 120 and inhibit axial and/or rotational movement of the collar 122. The fastener 196 may be of any suitable type. For example, the fastener 196 may be a threaded fastener, such as a bolt. Left-hand or right-hand threads may be provided on the fastener 196 and corresponding threads on the pinion fastener hole 192 and/or collar fastener hole 194 to oppose the rotational forces that may be exerted upon the pinion gear assembly 190 as previously discussed. The pinion 120 may include a recess 198 that may receive the collar 122 in one or more embodiments. Moreover, the collar fastener hole 194 may be countersunk or have an enlarged diameter that may receive the head of a fastener 196. The bearing 124 may be press fit onto the collar 122 to inhibit movement of the bearing 124 and a collar snap ring 78 may or may not be provided to inhibit axial movement of the bearing 124 as previously described.

The pinion gear assemblies described above may yield various advantages as compared to a similarly configured one-piece pinion design. For example, a one-piece pinion design that does not include a separate collar would have a hub portion having a larger diameter. A hub portion having a larger diameter would incur substantial material removal when the gear teeth on the pinion are cut due to the configuration and path of travel of the gear tooth cutting tool. Such material removal from an enlarged hub portion would reduce the strength of the hub portion and cut through at least part of any snap ring groove that is provided on the hub portion, thereby reducing strength and durability with respect to axial load forces. The pinion gear assemblies described above allow a hub portion to be provided with a smaller diameter, thereby reducing or eliminating material removal from the hub portion during gear tooth cutting, thereby improving the strength and durability of the hub portion, reducing pinion machining time, reducing machining waste, and improving cutting tool life. Increasing the diameter of the gear portion (i.e., moving the gear teeth further from the axis) to reduce or avoid cutting of the hub portion during gear tooth cutting would increase overall package space and weight of the pinion. Likewise, reducing the face width or length of the gear teeth to reduce or avoid material removal from the hub portion during gear tooth cutting would decrease bending strength, surface strength, and durability of the pinion. As such, the pinion gear assemblies described above may provide a more compact design and allow the face width of the gear teeth to be increased, thereby improving bending strength, surface strength, and load force distribution and increasing gear life. Increased gear face width may also increase the contact area between the pinion gear teeth and teeth of a mating gear, thereby increasing the gear set contact ratio which in turn may reduce noise characteristics of the gear set during operation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pinion gear assembly comprising:
   a pinion that extends along an axis and has a gear portion, a hub portion disposed proximate the gear portion, a first shoulder, and a second shoulder, wherein the first shoulder and the second shoulder are interrupted by grooves between adjacent gear teeth;
   a collar that has a collar hole that receives the hub portion;
   a bearing that has a bearing hole that receives the collar; and
   a key that couples the collar to the hub portion, wherein the key is disposed between the bearing and the axis and extends through the collar into the hub portion;
   wherein the collar is fixedly disposed on the hub portion and engages the first shoulder and the bearing is fixedly disposed on the collar and engages the second shoulder.

2. The pinion gear assembly of claim 1 wherein the hub portion extends from an end surface of the pinion to the gear portion.

3. The pinion gear assembly of claim 1 wherein the bearing engages the pinion and the collar.

4. The pinion gear assembly of claim 1 wherein the first shoulder is provided with the gear portion.

5. The pinion gear assembly of claim 1 wherein the collar has a collar snap ring groove that extends completely around the collar, wherein the collar snap ring groove receives a collar snap ring that engages the bearing to inhibit movement of the bearing with respect to the collar.

6. A pinion gear assembly comprising:
   a pinion that extends along an axis and has a gear portion, a hub portion disposed proximate the gear portion, a first shoulder, and a second shoulder, wherein the first shoulder and the second shoulder are interrupted by grooves between adjacent gear teeth;
   a collar that has a collar hole that receives the hub portion and a collar snap ring groove, wherein the collar engages the first shoulder;
   a bearing that defines a bearing hole that receives the collar, wherein the bearing engages the second shoulder; and
   a collar snap ring disposed in the collar snap ring groove that inhibits movement of the bearing with respect to the collar.

7. The pinion gear assembly of claim 6 wherein the collar snap ring engages the bearing.

8. The pinion gear assembly of claim 6 wherein the collar has a first end surface, a second end surface disposed opposite the first end surface, an outer surface that extends from the first end surface to the second end surface and engages the bearing, and an inner surface disposed opposite the outer surface, wherein the collar snap ring groove is disposed proximate the second end surface and extends from the outer surface toward the inner surface.

9. The pinion gear assembly of claim 8 wherein the hub portion further comprises a hub keyhole and the collar further comprises a collar keyhole that extends from the outer surface to the inner surface, wherein a key is disposed in the hub keyhole and the collar keyhole to inhibit movement of the collar with respect to the pinion.

10. A pinion gear assembly comprising:
    a pinion that extends along an axis and has a gear portion, a shaft portion that extends from a first pinion end surface to the gear portion, and a hub portion that extends from a second pinion end surface to the gear portion;
    a collar that has a collar hole that receives the hub portion; and
    a bearing that has a bearing hole that receives the collar;
    wherein the pinion has a first shoulder and a second shoulder, wherein the collar engages the first shoulder and the bearing engages the second shoulder and the first shoulder and the second shoulder are interrupted by grooves between adjacent gear teeth; and
    wherein the collar is fixedly disposed on the hub portion and the bearing is fixedly disposed on the collar.

11. The pinion gear assembly of claim 10 wherein the gear portion has a tapered shape that becomes narrower in a direction that extends from the first pinion end surface toward the second pinion end surface.

12. The pinion gear assembly of claim 10 wherein the first shoulder is provided with the gear portion.

13. The pinion gear assembly of claim 12 wherein the second shoulder is provided with the gear portion.

14. The pinion gear assembly of claim 10 wherein the second shoulder extends radially outward with respect to the axis and the second shoulder is positioned further from the axis than the first shoulder.

15. The pinion gear assembly of claim 10 wherein the collar has a first end surface, a second end surface disposed opposite the first end surface, an outer surface that extends from the first end surface to the second end surface and engages the bearing, and an inner surface disposed opposite the outer surface, wherein the hub portion further comprises a hub keyhole and the collar further comprises a collar keyhole that extends from the outer surface to the inner surface, wherein a key is disposed in the hub keyhole and the collar keyhole to inhibit movement of the collar with respect to the pinion.

16. The pinion gear assembly of claim 10 wherein the collar has a first end surface, a second end surface disposed opposite the first end surface, an outer surface that extends from the first end surface to the second end surface and engages the bearing, and an inner surface disposed opposite the outer surface, wherein the first end surface engages the first shoulder.

17. The pinion gear assembly of claim 16 wherein the bearing has a first bearing end surface, a second bearing end surface disposed opposite the first bearing end surface, an outer bearing surface that extends from the first bearing end surface to the second bearing end surface, and an inner bearing surface disposed opposite the outer bearing surface that engages the collar, wherein the first bearing end surface engages the second shoulder.

18. The pinion gear assembly of claim 17 further comprising a collar snap ring that is disposed in a collar snap ring groove of the collar, wherein the collar snap ring inhibits movement of the bearing with respect to the collar and engages the second bearing end surface.

19. The pinion gear assembly of claim 15 further comprising a collar snap ring that is disposed in a collar snap ring groove of the collar, wherein the collar snap ring inhibits movement of the bearing with respect to the collar and wherein the key is disposed between the first shoulder and the collar snap ring.

* * * * *